(12) United States Patent
Beneker et al.

(10) Patent No.: US 8,196,466 B2
(45) Date of Patent: Jun. 12, 2012

(54) SENSOR FOR INDUCTIVE MEASURE OF FLUID LEVEL

(75) Inventors: Gerritt VanVranken Beneker, Lake Orion, MI (US); Robert Dean Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 465 days.

(21) Appl. No.: 12/431,451

(22) Filed: Apr. 28, 2009

(65) Prior Publication Data

US 2010/0269586 A1  Oct. 28, 2010

(51) Int. Cl.
*G01F 23/40* (2006.01)

(52) U.S. Cl. ........... 73/304 R; 73/309; 73/319; 73/322.5

(58) Field of Classification Search ............... 73/290 B, 73/290 V, 305–322.5
See application file for complete search history.

(56) References Cited

U.S. PATENT DOCUMENTS

| | | | |
|---|---|---|---|
| 255,749 A | 3/1882 | Woolson | |
| 1,671,106 A | 5/1928 | Fisher | |
| 2,081,364 A | 5/1937 | Melas | |
| 2,243,188 A * | 5/1941 | Biach | 137/391 |
| 2,359,927 A | 10/1944 | Melas | |
| 2,452,156 A | 10/1948 | Schover | |
| 4,592,741 A | 6/1986 | Vincent | |
| 4,651,130 A | 3/1987 | Pennell | |
| 5,291,782 A * | 3/1994 | Taylor | 73/319 |
| 5,867,022 A | 2/1999 | Eden et al. | |
| 6,185,994 B1 | 2/2001 | Liang | |
| 6,192,753 B1 | 2/2001 | Czarnek | |
| 6,289,731 B1 | 9/2001 | Lo | |
| 6,335,690 B1 | 1/2002 | Konchin et al. | |
| 6,561,022 B1 | 5/2003 | Doyle et al. | |
| 6,591,676 B2 | 7/2003 | Marioni | |
| 6,889,563 B2 | 5/2005 | Tomita et al. | |
| 7,016,744 B2 | 3/2006 | Howard et al. | |
| 7,411,479 B2 | 8/2008 | Baarman et al. | |
| 7,600,423 B1 * | 10/2009 | Fluhler et al. | 73/290 B |
| 2002/0053901 A1 | 5/2002 | Strayer et al. | |
| 2002/0157465 A1 * | 10/2002 | Marioni | 73/313 |
| 2006/0117847 A1 | 6/2006 | Lo | |
| 2008/0223452 A1 | 9/2008 | Lin | |

FOREIGN PATENT DOCUMENTS

| | | |
|---|---|---|
| DE | 4024110 A1 | 3/1991 |
| DE | 3934579 A1 | 4/1991 |
| FR | 1497415 A | 10/1967 |
| GB | 2202331 A | 9/1988 |

* cited by examiner

*Primary Examiner* — David Rogers
(74) *Attorney, Agent, or Firm* — Quinn Law Group, PLLC

(57) ABSTRACT

A sensor for measuring fluid level is provided that includes a float, which may be steel or another material that affects magnetic flux. The sensor further includes a housing defining a cavity configured to receive the float. The housing may be, but need not be, tubular, and the cavity may be cylindrical. At least one magnetic coil is wound to the housing along the cavity. The coil may be wound around the housing. The float is positionable in the fluid to move within the cavity in relation to fluid level.

20 Claims, 5 Drawing Sheets

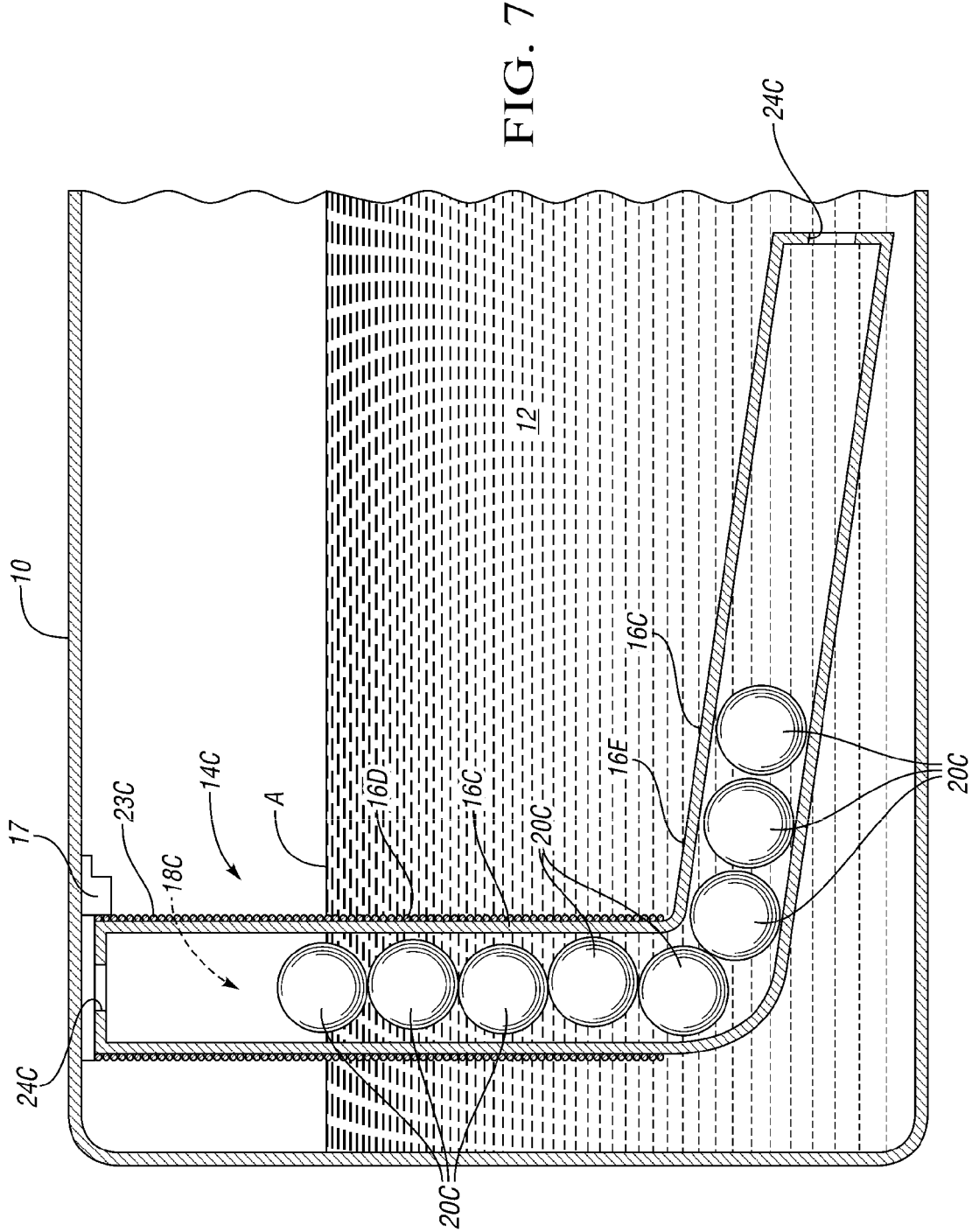

SENSOR FOR INDUCTIVE MEASURE OF FLUID LEVEL

TECHNICAL FIELD

The invention relates to a sensor for measuring fluid level.

BACKGROUND OF THE INVENTION

Liquid level meters measure an amount of liquid in a storage container. For example, in an automotive application, a liquid level meter, e.g., a fuel level sensor, typically measures an amount of fuel in a fuel tank and provides a signal to a fuel gauge of a vehicle.

Existing oil level sensors include a floating magnet that rests on top of oil in an oil pan and changes position based on the changing level of oil in the oil pan. As the float changes position, it operates a reed switch. However, the reed switch gives only an indication of high or low oil level.

Some existing fuel level sensors are subject to oxidative degradation from fuel components. In particular, degraded gasoline accelerates oxidative degradation. Some fuel level sensors have a wiper arm connected to a float. As the float rises with fuel level, the wiper arm contacts a variable resistor, which typically comprises a strip of resistive material, and creates an electrical circuit. Oxidative degradation increases the resistance of the electrical circuit and contributes to failure of the contact between the resistive material and the wiper arm.

SUMMARY OF THE INVENTION

Therefore, a highly accurate and robust liquid level meter is desired. A sensor for measuring fluid level is provided that includes a float, which may be steel or another material that affects magnetic flux. The sensor further includes a housing defining a cavity configured to receive the float. The housing may be, but need not be, tubular, and the cavity may be cylindrical. At least one magnetic coil is wound to the housing along the cavity. The coil may be wound around the housing. The float is positionable in the fluid to move within the cavity in relation to fluid level. Inductance of the coil varies in relation to the position of the float within the cavity and thereby in relation to the fluid level. Accordingly, the sensor may provide an output signal indicative of inductance, and therefore of fluid level, in response to an input signal such as an alternating current or pulsed digital current.

In several embodiments, the coil is configured to provide an inductance that varies along the axial length of the cavity. Accordingly, the float need not extend beyond the housing nor beyond the coil, as a unique output signal level will correspond with a specific location of the float within the cavity even when the length of the float is less than that of the cavity. A full range of measurement of fluid level in a container is therefore possible while minimizing the overall height of the sensor and corresponding packaging space.

In at least one embodiment, multiple coils are used, with each coil wound around a respective axial segment of the cavity. A multiplex component may be used to determine which coil the float is adjacent to, and hence the fluid level, by scanning the output values (e.g., current draw) of the various coils. The coil or coils adjacent the float will be apparent as the output signal will be varied due to the affect of the float on the inductance of the coil(s).

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic partially cross-sectional illustration of a fifth embodiment of a fluid level sensor within the container.

DESCRIPTION OF THE PREFERRED EMBODIMENTS

Figure 1:
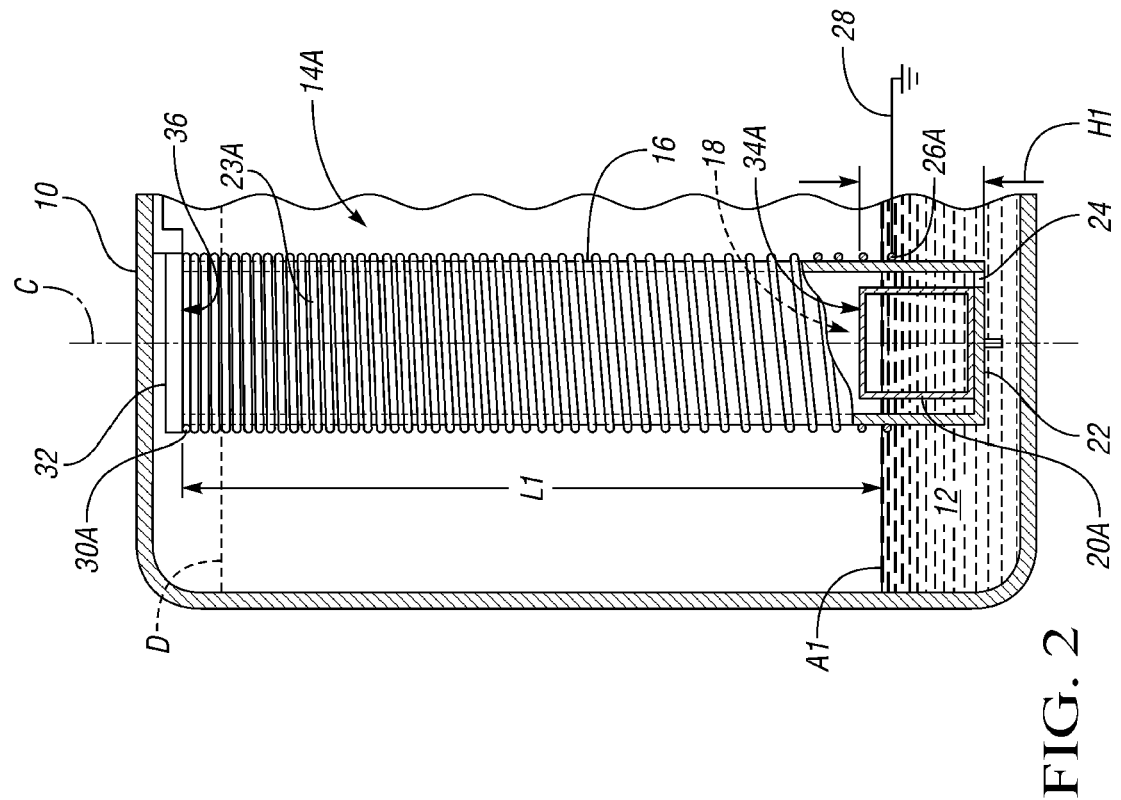
FIG. 1 is a schematic fragmentary cross-sectional illustration of a first embodiment of a fluid level sensor within a fluid container.

Referring to the drawings, wherein like reference numbers refer to like components throughout the several views, FIG. 1 shows a fluid container 10, such as but not limited to an automotive fuel tank or oil pan. The fluid container 10 holds fluid 12, shown at a first fluid level A. A fluid level sensor 14 is positioned in the fluid container 10 such that it is at least partially immersed in the fluid 12. The fluid level sensor 14 is elongated, and is preferably, although not necessarily, positioned with a center axis C generally upright when the container 10 is level.

The fluid level sensor 14 includes a housing 16 shown schematically mounted to the container 10 with a bracket 17. Other methods of mounting the sensor 14 to the container 10 include fitting the sensor 14 through an opening in the container 10 or mounting the sensor 14 at a locator extending from the bottom of the container 10. Any of these methods will be recognized and understood by those skilled in the art of fluid measurement or fluid sensors, such as sensors used in automotive practice (e.g., fuel tanks and engines). In the embodiment of FIG. 1, the housing 16 is a plastic tubular component. The housing 16 defines a cavity 18, which in this embodiment is generally cylindrical. A metallic float 20 is housed within the cavity 18. The float 20 is a relatively thin metallic material, such as steel. A plug 22 is fitted to the bottom end of the housing 16 to contain the float 20 within the cavity 18. The plug 22 has at least one opening 24 that permits fluid 12 to enter into the cavity 18 and surround the float 20. Additional openings may also be provided in the plug 22 or in the side of the housing 16.

The fluid level sensor 14 includes an energizable inductive coil 23 wound around a portion of the housing 16 to substantially surround the cavity 18. The coil 23 may have a coating, such as a sprayed or painted epoxy, or a plastic covering to protect the coil from exposure to the liquid. The coil 23 is a single, continuous coil wound helically to establish an axial length L. A first end 26 of the coil 23 is connected to a ground 28, such as to a side of the container 10. The ground 28 may alternatively be at other locations, such as a ground located in the power electronics 32, similar to the grounding ring of FIG. 5, described below. A second end 30 of the coil 23 is connected with power electronics 32, shown in FIG. 1 as integral with the sensor 14 (i.e., mounted to the housing 16 such that the power electronics 32 and other components of the sensor 14 are bundled as a module), but which may alternatively be remote from and operatively connected with the sensor 14, such as through an opening in the container 10. The coil 23 is wound with turns equidistant from one another (i.e., with a non-varying pitch).

The float 20 is configured to float in the fluid 12 such that an upper extremity rests slightly above the upper surface of the fluid 12. Thus, as fluid level increases, such as to level D, the float 20 rises within the cavity 18, passing into the center of the wound coil 23. The float 20 will be adjacent to an increasing number of turns of the coil 23 as the fluid level rises in the container 10 from level A to level D. Thus, each position of the float 20 within the cavity 18 causes a unique inductance in the coil 23.

The coil 23 is an inductive, magnetic coil. Thus, when a varying current is provided to the coil by the electronics 32, such as an alternating current or a pulsed width direct current, the inductance of the coil 23 will vary depending on the position of the float 20. Alternatively, the coil 23 may be used as part of an oscillation circuit. The frequency of oscillation will be proportionate to inductance of the coil 23, and thus the position of the float 20 within the housing 16. As the float 20 moves from a low extreme shown in FIG. 1 to a high extreme at which it can rise no further in the cavity 18 (due to interference with an upper portion of the housing 16), the number of turns of coil 23 laterally adjacent the float 20 continuously changes. Thus, flux lines of the energized coil 23 are continuously concentrated by the effect of the adjacent metallic float 20, and the inductance of the coil 23 continuously increases from a first low level when the float 20 is at the position shown in FIG. 1, to a high level when a top surface 34 of the float 20 encounters a bottom surface 36 of the upper end of the housing 16. Because of the non-varying pitch of the single coil 23, the inductance per axial length of the housing 16 with the wound coil 23 does not vary in this embodiment. In order to provide a continuously changing inductance, and thus a unique indication of each float level (and corresponding fluid level), the height H of the float 20 must be substantially equivalent to the length L of the wound coil 23. A float 20 of a lesser height would be positioned within the cavity 18 at different positions by different fluid levels, but would be adjacent an equal number of turns of the coil 23, thus resulting in equal levels of inductance in the coil at the different positions. Accordingly, fluid levels below level A are not uniquely identifiable by the sensor 14.

Figure 2:
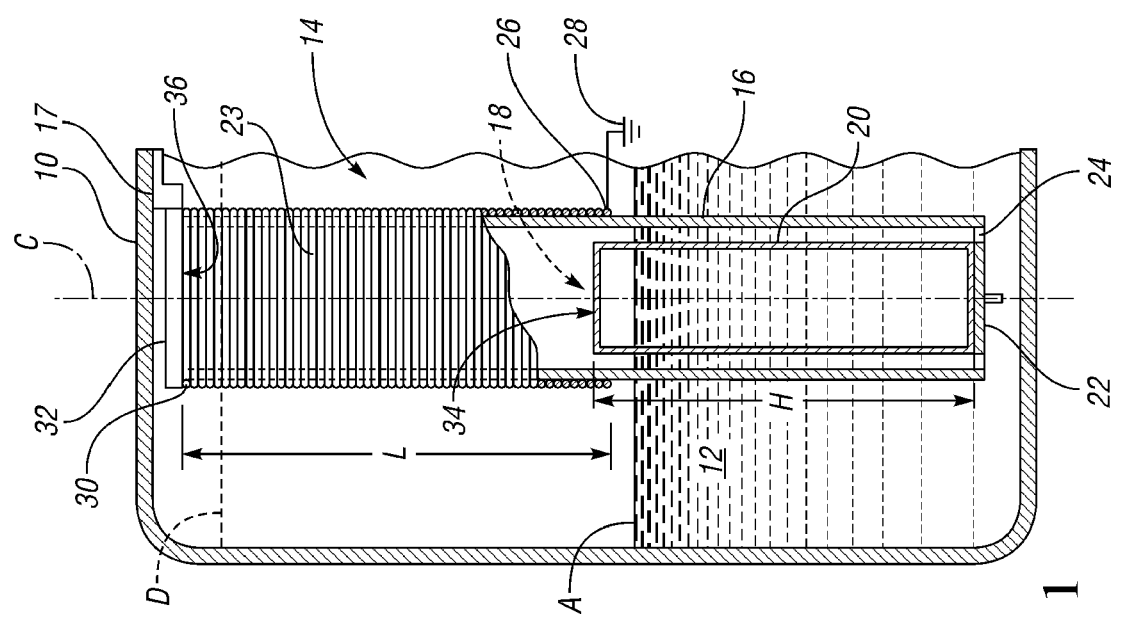
FIG. 2 is a schematic fragmentary cross-sectional illustration of a second embodiment of a fluid level sensor within the container.

Referring to FIG. 2, another embodiment of a fluid level sensor 14A is shown in fluid container 10. Fluid level sensor 14A provides a varying inductance per unit axial length of the housing 16 with the wound coil 23A, and so enables a shorter float 20A. Components identical to those shown and described with respect to FIG. 1 are shown with like reference numbers. Fluid level sensor 14A also utilizes a single wound coil 23A, but the coil is wound with a varying pitch along the housing 16, so that inductance of the sensor 14A per axial length of the housing 16 will vary, allowing float 20A with a significantly shorter axial height H1 to be used. With the shorter float 20A, the sensor 14A provides output signals indicative of float position over an extended range of fluid levels within the container 10, from fluid level A1 to fluid level D.

Coil 23A is a single coil, with an end 26A connected to ground 28, and another end 30A connected to power electronics 32. Inductance of the coil 23A will vary continuously as the float 20A rises from the position shown in FIG. 2 to a position in which surface 34A abuts surface 36 of housing 16. The pitch between adjacent coil turns can be varied continuously from one end of the wire to the other, with each adjacent turn being either closer (as shown in FIG. 2) or farther from the previous turn as the float 20A moves upward in the housing 16. Alternatively, segments or regions of the wound coil 23A may be wound with like pitch, as long as each region of the wound coil 23A along the axial length L1 having a consistent pitch between axial adjacent coils is no longer than the height H1 of the float 20A. Thus, as the float 20A moves through a region, the coil provides a different inductance level for each position of the float 20A. When the float 20A then moves higher or lower to another region, the pitch of the wire 23A is different, with adjacent coils closer or further, respectively, from one another than in the previous region.

Figure 3:
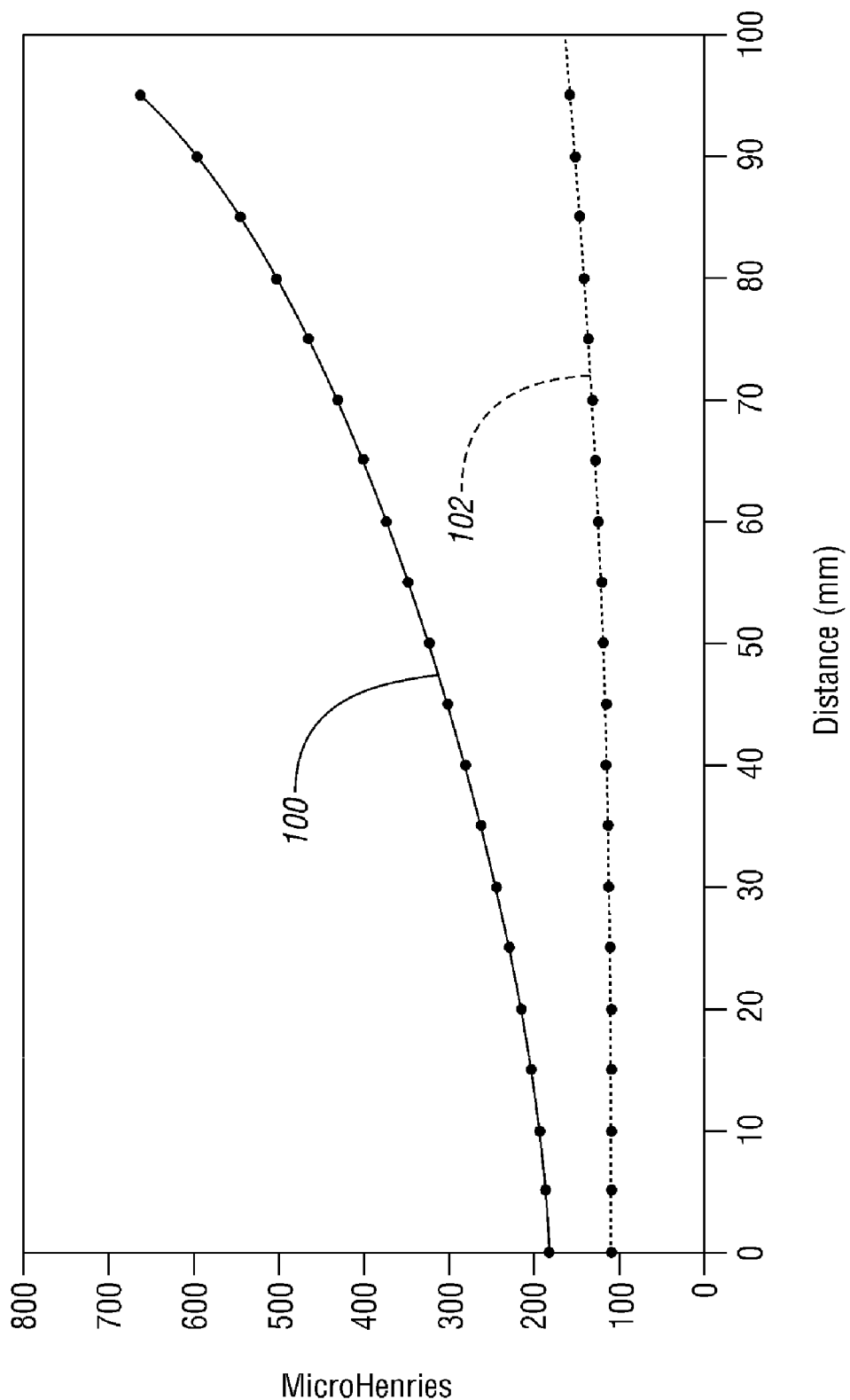
FIG. 3 is a plot of inductance (microHenries) versus float travel distance (millimeters) for a first float and a second float used in the sensor of FIG. 2.

Referring to FIG. 3, curve 100 shows inductance measured in microHenries versus distance in millimeters of float 20A having a height H1 of 2 inches and moving a distance measured from the position shown in FIG. 2 upward in cavity 18 at various distances to approximately 95 mm (i.e., a fluid level range of 95 mm). Inductance varies from approximately 200 microHenries to approximately 700 microHenries. The coil 23A is 30 gage magnet wire with 179 turns. Curve 102 shows inductance versus distance when float 20A is replaced with a float having a height of 0.6 inches in the sensor 14A of FIG. 2. Inductance varies from approximately 120 microHenries to 160 microHenries over the same float travel distance (fluid level range). Thus, the larger float 20A provides a more precise correlation of fluid level readings over the fluid level range.

Figure 4:
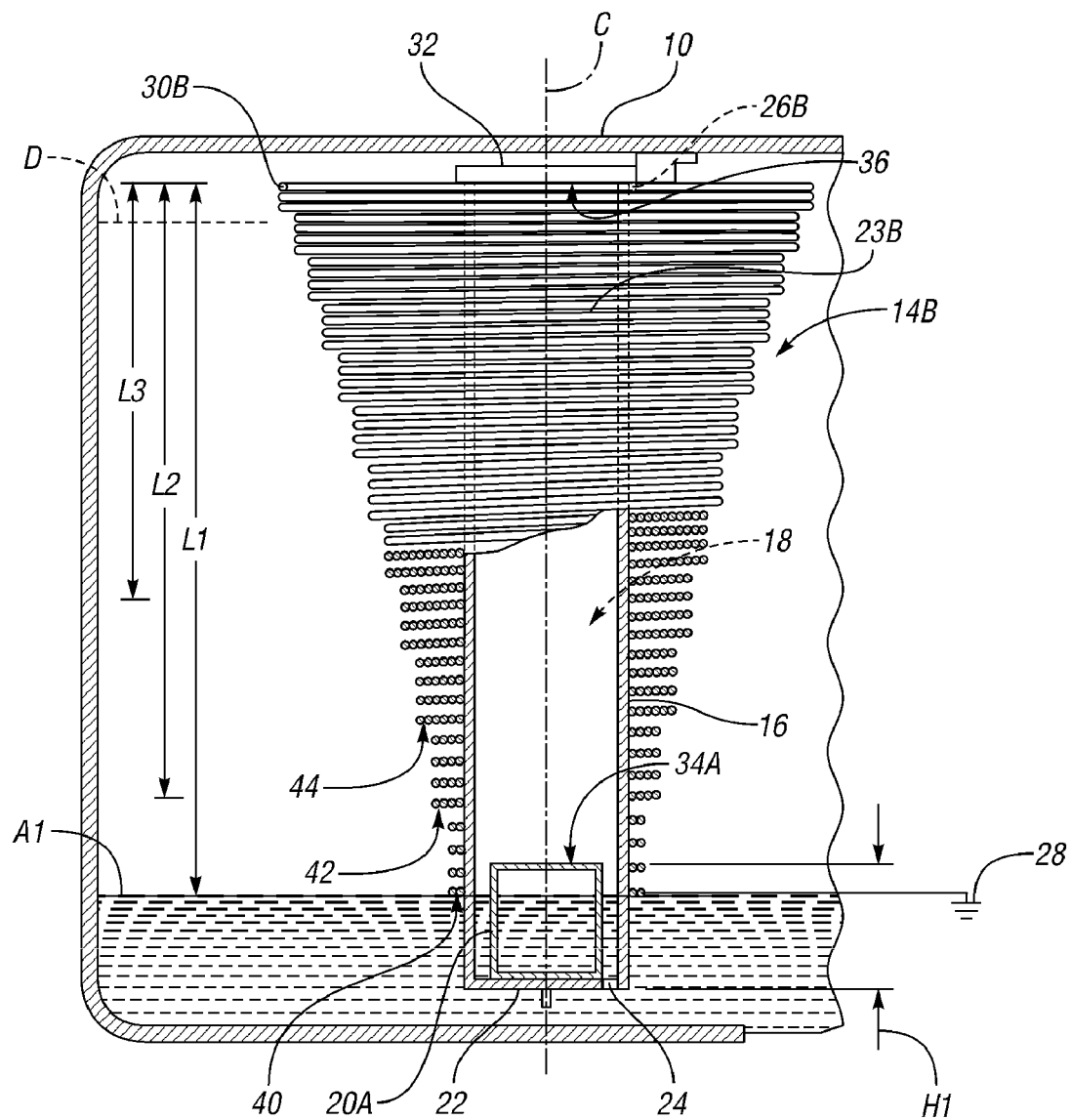
FIG. 4 is a schematic fragmentary cross-sectional illustration of a third embodiment of a fluid level sensor within the container.

Referring to FIG. 4, another embodiment of a fluid level sensor 14B is shown in fluid container 10. Components identical to those shown and described with respect to FIGS. 1 and 2 are shown with like reference numbers. Fluid level sensor 14B utilizes a single wound coil 23B, but the coil 23B is wound to form stacked adjacent layers of decreasing axial length along the housing 16. Accordingly, inductance per unit length of the sensor 14B will vary along the axial length L1 of the wound coil 23B, allowing float 20A with a significantly shorter axial height H1 to be used. As in the embodiment of FIG. 2, with a shorter float 20A, the sensor 14B provides output signals indicative of float position over an extended range, from fluid level A1 to fluid level D.

Coil 23B is a single coil, with an end 26B connected to a ground 28 shown for purposes of illustration near the bottom of the container 10, but likely located at the power electronics 32, and another end 30B connected to an output of the power electronics 32. Because the coil 23B is wound in stacked layers, inductance of the coil 23B will vary continuously as the float 20A rises from the position shown in FIG. 4 to a position in which surface 34A abuts surface 36 of housing 16. The coil 23B is wound with a first inner layer 40 extending from end 26B upward along the outer surface of housing 16 with an overall length L1. At the end of the first layer 40, winding continues downward again, partially extending over first layer 40 to form a second layer 42, but with a shorter length L2. Winding then continues upward from L2 to an upper end of the housing 16, and then downward an axial length L3 and back to the upper end of the housing 16 to form a third layer 44. Each layer is formed by two rows of coil turns in the radial direction. Winding continues, with the difference in axial length between each adjacent layer (i.e., difference between lengths L1 and L2; difference in lengths between L2 and L3, etc.) being not greater than the height H1 of the float 20A. Accordingly, each position of the float 20A, and therefore each fluid level, causes a unique inductance level in the coil 23B. Increasing the total number of coil turns used to form the stacked layers 40, 42, 44 results in a greater inductance in milliHenries and a greater range of inductance readings as the float 20A moves though the cavity 18 along the axial length L1 of the coil 23B.

Figure 6:
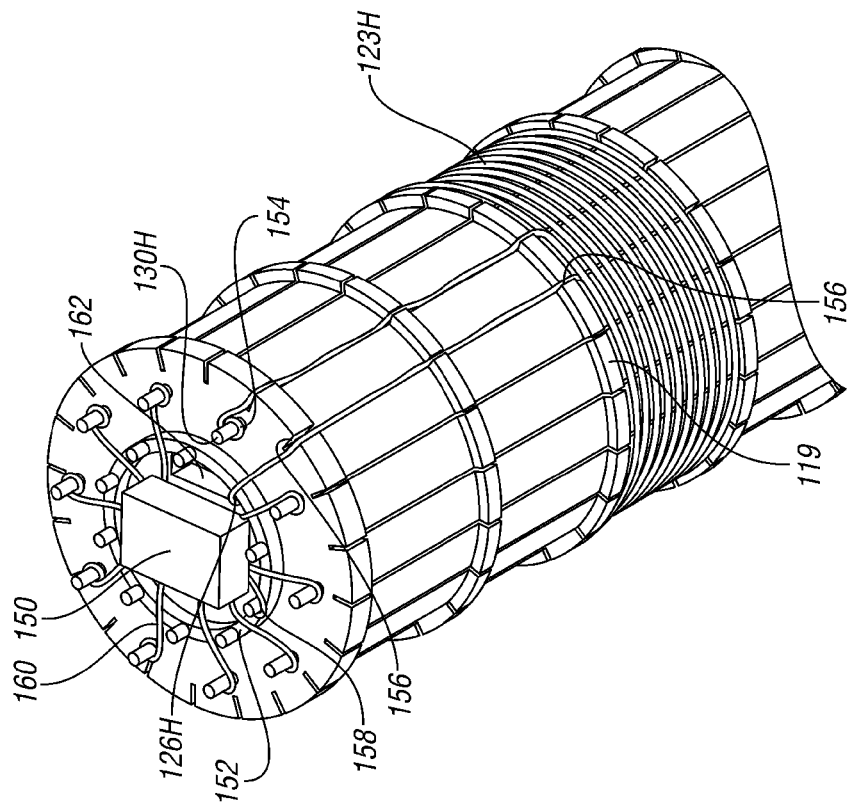
FIG. 6 is a perspective fragmentary view of the fluid level sensor of FIG. 5.
Figure 5:
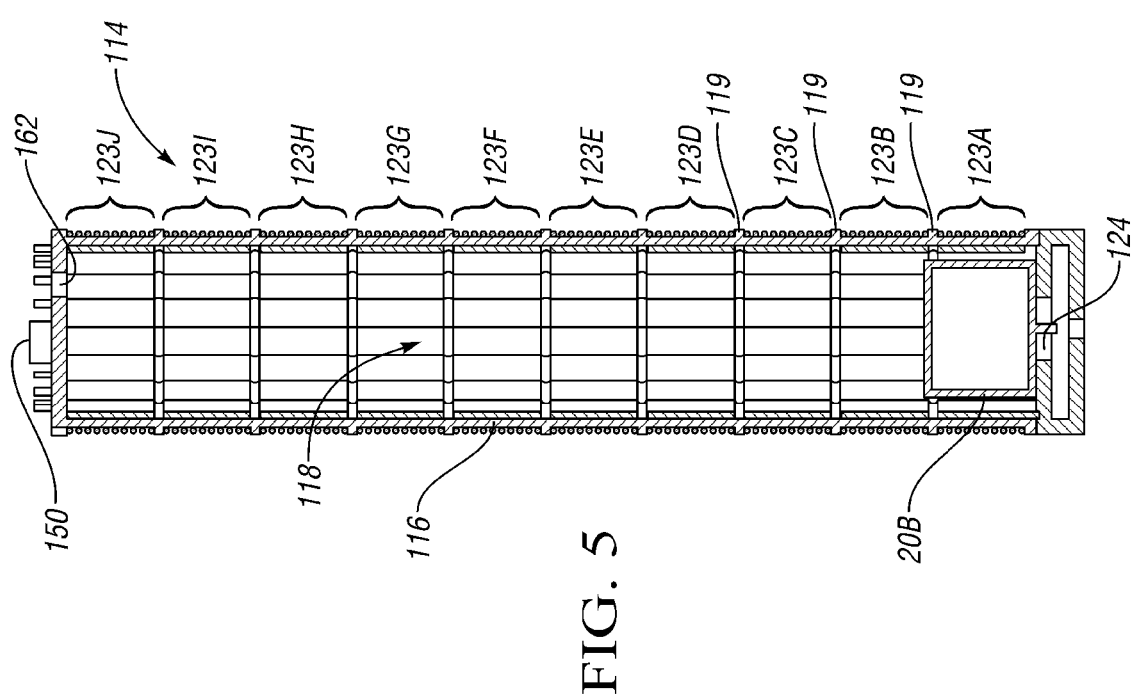
FIG. 5 is a schematic fragmentary cross-sectional illustration of a fourth embodiment of a fluid level sensor within the container.

Referring to FIG. 5, another embodiment of a sensor 114 for placement in the fluid container 10 of FIGS. 1, 2 and 4 is illustrated. The sensor 114 has a housing 116, also referred to as a totem as it is configured to form ten axial segments or winding areas separated by radial extending ribs 119. Each axial segment houses a separate coil 123A-123J. A multiplex electronics device 150 is mounted to an upper end of the housing 116. As shown in FIG. 6 with exemplary coil 123H, one end 126H of coil 123H is grounded to a post of grounding ring 152. Another end 130H of the coil 123H is connected to output post 154. Each respective coil 123A-23J is wound respectively, beginning with the furthest coil 123A, by connecting the grounded end 126H to ring ground 152, leading the coil down radially-aligned slots 156 in the ribs 119 to the appropriate winding area. The coil is then wound in an even number of layers (2, 4, or 6, etc.), so that the opposite end of the coil will be positioned to extend upward through adjacent slots 156 to mount to post 154.

The multiplex 150 is grounded to one of the posts of grounding ring 152 with grounding wire 158, and is connected to each output post 154 with respective output lead wires 160. A fluid opening 162 is formed in the top of the housing 116, along with opening 124 in the bottom of the housing (see FIG. 5) to permit fluid access to the cavity 118. The openings 124, 162 may be designed to dampen sloshing within the housing 116. The multiplex 150 may have a processor configured to scan the output readings (e.g., current draw) at the output posts 154 sequentially. Preferably, each axial segment is substantially similar in overall axial height as the float 20B. Thus, the inductance of only a single one of the coils 123A-123J, or two adjacent ones of the coils 123A-123J should be affected by the position of the float 20B within the cavity. The output post or posts providing a different output reading will be indicative of the position of the float 20B.

FIG. 7 shows another embodiment of a sensor 14C mounted within the container 10. The sensor 14C has a housing 16C that is mounted to the container 10 with bracket 17. Preferably, the housing 16C is a plastic tubular component. The housing 16C is angled, and is mounted to the container 10 with a first portion 16D substantially vertical and a second portion 16E extending at an angle lower in the container 10 than the first portion 16D. The housing 16C defines a cavity 18C. Each of the ends of the cavity 18C has an opening 24C, or contains a plug with an opening, to permit fluid 12 to enter the cavity 18C, achieving a level substantially the same as the fluid level A in the container 10. Additional openings may be provided elsewhere in the housing 16C. Multiple metallic floats 20C are contained within the cavity. The floats 20C are independent from one another. The floats 20C are shown as balls, but may have other shapes.

A single energizable inductive coil 23C is wound around the first portion 16D of the housing 16C with constant spacing between coil turns (i.e., with non-varying pitch). Similar to the coil 23 of FIG. 1, one end of the coil 23C is connected to a ground, such as the side of the container 10, and the other end is connected to power electronics (not shown) by which current is supplied to the coil 23C. The individual floats 20C stay in contact with one another as they rise or fall within the housing 16C as fluid level increases or decreases. The stack of individual floats 20C behaves magnetically the same as a single float of the same overall length. As the stack moves with changing fluid level, a unique inductance in the coil 23C results from every position of the stack. Thus, fluid levels along the entire axial length of the wound coil 23C are uniquely identifiable by the sensor 14C.

Because the housing 16C is angled, the first portion 16D, which is the operative portion for measuring fluid level, can extend lower into the container 10, as the stack of floats 20C, or a portion thereof, will rest in the angled second portion 16E at lower fluid levels. Thus, the axial length of the coil 23C is greater, resulting in a broader range of fluid level measurement. If the container 10 is subjected to vibrations, such as if the container 10 is an engine oil pan, the vibrations will help the floats 20C to move through the elbow formed between the first and second portions 16D, 16E of the housing 16C.

In the embodiment shown, the housing 16C is mounted within the container 10. Alternatively, the housing 16C could be mounted external to the container 10, with the end of the second portion 16E in fluid communication with the container 10.

Accordingly, the embodiment of FIG. 1 provides a relatively simple fluid level sensor 14 that may be mounted completely within the fluid container 10. The embodiments of FIGS. 2 and 4 create a unique inductance in the sensor 14A, 14B at every float level, allowing use of relatively short float, and enabling a greater range of measurement of fluid levels within the container 10. The embodiment of FIGS. 5 and 6 also allows the use of a relatively short float 20B and an extended range of fluid level measurement within the container 10. The embodiment of FIG. 7 allows an extended range of fluid measurement within the container 10, by utilizing an angled housing 16C and a stack of individual floats 20C.

While the best modes for carrying out the invention have been described in detail, those familiar with the art to which this invention relates will recognize various alternative designs and embodiments for practicing the invention within the scope of the appended claims.

The invention claimed is:

1. A sensor for measuring fluid level comprising:
an at least partially metal float;
a housing defining a cavity configured to receive the float;
at least one magnetic coil wound to the housing along the cavity; wherein the at least one magnetic coil is a single coil wound with turns along an axial length of the cavity;
wherein the turns vary in pitch;
wherein the float is positionable in the fluid to move within the cavity in relation to fluid level; and
wherein inductance of the at least one magnetic coil varies in relation to the position of the float within the cavity and thereby in relation to the fluid level.

2. The sensor of claim 1, wherein the at least one magnetic coil provides an electronic output signal corresponding with the variable inductance in response to an alternating current.

3. The sensor of claim 1, wherein the at least one magnetic coil provides an electronic output corresponding with the variable inductance in response to a pulsed direct current.

4. The sensor of claim 1, wherein the float does not extend axially beyond the at least one magnetic coil within the cavity.

5. The sensor of claim 1, wherein respective regions of the at least one magnetic coil have respective different pitches, each of said regions having a height not greater than a height of the float.

6. The sensor of claim 1, further comprising power electronics mounted to the housing; wherein one end of the at least one magnetic coil is grounded and another end of the at least one magnetic coil is connected to the power electronics.

7. The sensor of claim 1, wherein the at least one magnetic coil is wound around an outer surface of the housing and is at least partially within the fluid.

8. A sensor for measuring fluid level comprising:
a steel float;
a tubular housing defining a cylindrical cavity configured to receive the float;
at least one magnetic coil wound helically around the housing along the cavity;
wherein the at least one magnetic coil is a single coil wound with turns increasing in pitch along an axial length of the cavity; wherein the float is positionable in the fluid to move within the cavity in relation to fluid level; and
wherein inductance of the at least one magnetic coil varies in relation to the position of the float within the cavity and thereby in relation to the fluid level.

9. The sensor of claim 8, wherein respective regions of the at least one magnetic coil have respective different pitches, each of said regions having a height not greater than a height of the steel float.

10. The sensor of claim 8, further comprising power electronics mounted to the housing; wherein one end of the at least one magnetic coil is grounded and another end of the at least one magnetic coil is connected to the power electronics.

11. The sensor of claim 8, wherein the at least one magnetic coil is at least partially within the fluid.

12. An assembly comprising:
a container configured to contain fluid;
a float adapted to float in the fluid;
a housing mounted to the container and at least partially within the container and defining a cavity configured to receive the float such that the float moves within the cavity in relation to fluid level in the container;
at least one magnetic coil wound around the housing along the cavity and at least partially in the fluid; wherein respective regions of the at least one magnetic coil have respective different pitches, each of said regions having a height not greater than a height of the float; and
wherein inductance of the at least one magnetic coil varies in relation to the position of the float within the cavity, so that an electrical output of the at least one magnetic coil thereby corresponds with fluid level in the container.

13. The assembly of claim 12, wherein the at least one magnetic coil provides an electronic output signal corresponding with the variable inductance in response to an alternating current.

14. The assembly of claim 12, wherein the at least one magnetic coil provides an electronic output corresponding with the variable inductance in response to a pulsed direct current.

15. The assembly of claim 12, wherein the float does not extend axially beyond the at least one magnetic coil within the cavity.

16. The assembly of claim 12, further comprising power electronics mounted to the housing; wherein the at least one magnetic coil is a single wound coil with one end grounded and another end connected to the power electronics.

17. An assembly comprising:
a container configured to contain fluid;
a float adapted to float in the fluid;
a housing mounted to the container and at least partially within the container and defining a cavity configured to receive the float such that the float moves within the cavity in relation to fluid level in the container;
at least one magnetic coil wound around the housing along the cavity and at least partially in the fluid;
wherein inductance of the at least one magnetic coil varies in relation to the position of the float within the cavity, so that an electrical output of the at least one magnetic coil thereby corresponds with fluid level in the container; and
wherein the at least one magnetic coil is a single coil wound with turns along an axial length of the cavity; wherein the turns vary in pitch.

18. The assembly of claim 17, wherein the at least one magnetic coil provides an electronic output signal corresponding with the variable inductance in response to an alternating current.

19. The assembly of claim 17, wherein the at least one magnetic coil provides an electronic output corresponding with the variable inductance in response to a pulsed direct current.

20. The assembly of claim 17, wherein the float does not extend axially beyond the at least one magnetic coil within the cavity.

\* \* \* \* \*